US008125448B2

(12) United States Patent
Ranta et al.

(10) Patent No.: US 8,125,448 B2
(45) Date of Patent: Feb. 28, 2012

(54) WEARABLE COMPUTER POINTING DEVICE

(75) Inventors: Craig Steven Ranta, Redmond, WA (US); Steven Nabil Bathiche, Kirkland, WA (US); Monique Chatterjee, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1061 days.

(21) Appl. No.: 11/544,380

(22) Filed: Oct. 6, 2006

(65) Prior Publication Data

US 2008/0084385 A1 Apr. 10, 2008

(51) Int. Cl.
*G09G 5/08* (2006.01)

(52) U.S. Cl. ........... 345/158; 345/157; 345/167; 700/83

(58) Field of Classification Search .......... 345/156–184; 348/211.99; 341/20–22; 340/825.19; 711/169; 910/73; 710/73; 700/83; 715/856; 463/37–38
See application file for complete search history.

(56) References Cited

U.S. PATENT DOCUMENTS

| | | | | |
|---|---|---|---|---|
| 4,107,555 | A * | 8/1978 | Haas et al. | 307/116 |
| 5,796,354 | A | 8/1998 | Cartabiano et al. | |
| 5,825,350 | A * | 10/1998 | Case et al. | 345/163 |
| 5,898,421 | A | 4/1999 | Quinn | |
| 6,140,981 | A | 10/2000 | Kuenster et al. | |
| 6,466,831 | B1 * | 10/2002 | Shibata et al. | 700/85 |
| 6,748,281 | B2 * | 6/2004 | Alsio | 700/83 |
| 6,850,224 | B2 | 2/2005 | Baughman | |
| 7,092,785 | B2 * | 8/2006 | Alsio et al. | 700/168 |
| 2001/0040552 | A1 * | 11/2001 | Mehr | 345/157 |
| 2002/0158827 | A1 | 10/2002 | Zimmerman | |
| 2003/0076296 | A1 * | 4/2003 | Kolybaba | 345/156 |
| 2003/0137489 | A1 * | 7/2003 | Bajramovic | 345/158 |
| 2003/0149803 | A1 * | 8/2003 | Wilson | 710/1 |
| 2005/0151673 | A1 | 7/2005 | Mercier | |
| 2005/0156876 | A1 * | 7/2005 | Kong | 345/156 |
| 2006/0038783 | A1 * | 2/2006 | Shaw et al. | 345/163 |

(Continued)

FOREIGN PATENT DOCUMENTS

WO WO2006068357 A1 10/2006

OTHER PUBLICATIONS

"Cordless PC remote controls by Gyration—on the desk, in the air, ANYWHERE!", Date: 2005, http://www.gyration.com/gyration/productdownloads/Gyration%20Product%20Catalog%201-206.pdf.

(Continued)

*Primary Examiner* — Lun-Yi Lao
*Assistant Examiner* — Olga Merkoulova
(74) *Attorney, Agent, or Firm* — Hope Baldauff Hartman, LLC

(57) ABSTRACT

Described is a technology by which a computer pointing device (generally a mouse but alternatively a game controller or remote control device) may be worn on the hand and operated without needing to contact a mousing surface. Gyroscopic-based sensors convert the wearer's hand and wrist movements to signals which are sent to a host computing device such as a conventional personal computer, a gaming console, an electronic appliance, and so forth. The data received from the pointing device may be used to move a cursor or the like, and other received data may correspond to left and right mouse clicks, scrolling operations, and so forth. A user-controlled enable switch/sensor selectively activates or deactivates the pointing device so that only intended movements result in data transmission. Gestures may also be sensed and used to trigger defined functions.

15 Claims, 6 Drawing Sheets

U.S. PATENT DOCUMENTS

2006/0038890 A1* 2/2006 MacIntosh et al. ...... 348/211.99
2006/0040712 A1 2/2006 Ansari et al.

OTHER PUBLICATIONS

Hamette et al., "Fingermouse: A Wearable Hand Tracking System", Date: 2002, http://www.wearable.ethz.ch1fileadmin/pdCfiles/pub/ubicomp02-fingermouse.pdf.

Howard et al., "Lightglove: Wrist-Worn Virtual Typing and Pointing", Date: 2001, http://www1.cs.columbia.edu/graphics/courses/mobwear/resources/Lightglove.pdf#search=%22%22Lightglove%3A%20Wrist-worn%0virtual%20typing%20and%20pointing%22%22.

Kim et al., "A New Wearable Input Device: SCURRY", Date: Dec. 2005, vol. 52, No. 6, http://ieeexplore.ieee.org/ie15/41/33004/01546364.pdf?isnumber=33004&prod=INI_&arnumber=1546364&arnumber=1546364&aeSt=.

Howard et al., "Lightglove: Wrist-Worn Virtual Typing and Pointing", Date: 2001, http:// www1.cs.columbia.edu/graphics/courses/mobwear/resources/Lightglove.pdf#search=%22%22Lightglove%3A%20Wrist-worn%20virtual%20typing%20and%20pointing%22%22.

* cited by examiner

WEARABLE COMPUTER POINTING DEVICE

BACKGROUND

Traditional pointing devices have been designed for use on a horizontal desktop surface, with the user seated upright and not engaged in other activity. With personal computers now being used in living rooms for multimedia, and the multimedia and computing possibilities of game consoles such as Microsoft® Xbox 360™, traditional pointing devices are often not practical in many scenarios. For example, a traditional mouse does not allow a user to use it without a surface, nor to do so in a relaxed posture, yet this is often the desired case in a living room or media room environment.

Moreover, even with a desktop personal computer, users could benefit from off-desk navigation. For example, many users surf the web or read documents for long periods of time without the need to enter text on the keyboard. Many such users would like to navigate without having to stretch to reach a mousing surface; for example, it would be desirable to simply to lean back and read, yet be able to navigate news articles or long documents as necessary, without close proximity to a horizontal mousing surface.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a pointing device is configured for wearing on a user's hand, and includes circuitry that senses hand movements. The circuitry includes at least two gyroscopic sensors including a first sensor that senses pitch and a second sensor that senses yaw. The circuitry also includes a transmitter that transmits data corresponding to the sensed movement to a host computing device coupled to the pointing device, e.g., a personal computer, a gaming console, or an electronic appliance. Other sensors, such as a third gyroscopic sensor that senses roll, one or more linear accelerometers, and/or one or more magnetometers may be incorporated into the wearable pointing device, such as to sense gestures that map to functions that may be performed.

In one example, the pointing device is generally U-shaped, and has a first part that fits in the user's palm coupled to a second part that fits behind the user's knuckles. The pointing device may include an enable switch, such as a capacitive proximity sensor that is actuated when the user's hand is closed, or a mechanical button that is actuated when depressed, such that the circuitry transmits movement information only when the enable switch is actuated. The pointing device also may include actuation mechanisms corresponding to left and right mouse buttons, e.g., actuated by a thumb or finger.

In one example, a microcontroller may be used to detect engagement of each actuation mechanism, and to process the digital data (corresponding to the sensed movement signals) and data corresponding to actuation detection into packetized data for transmission. A transmitter is coupled to the microcontroller to transmit the packetized data to a host computing device, e.g., the packetized data may be formatted for Bluetooth® radio communication. The microcontroller also may perform a mathematical computation on the digital data, such as an integration of the sensor data.

One of the actuation mechanisms may be an enable mechanism coupled to the microcontroller, such that the microcontroller ignores movement information when the enable mechanism is not actuated. Other actuation mechanisms may comprise left and right mouse buttons.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards a wearable pointing device, which can be considered a mouse or a game controller, and which utilizes gyroscope technology. As will be understood, the wearable pointing device allows its wearer a great amount of freedom of posture during mousing or other operation, and further allows the wearer to maintain use of the hand on which it is worn, e.g., for typing or holding objects. The wearable pointing device 110 also may be used in conjunction with another pointing device, such as to supplement a conventional mouse.

In one example implementation, the wearable pointing device is designed with a generally U-shaped form factor that slides over the hand, with one part resting against the palm and the other part resting on the back of the hand, e.g., generally behind the knuckles. As can be readily appreciated, however, this is only one example, and numerous other form factors are feasible. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used in various ways that provide benefits and advantages in computing and pointing in general.

Figure 1:
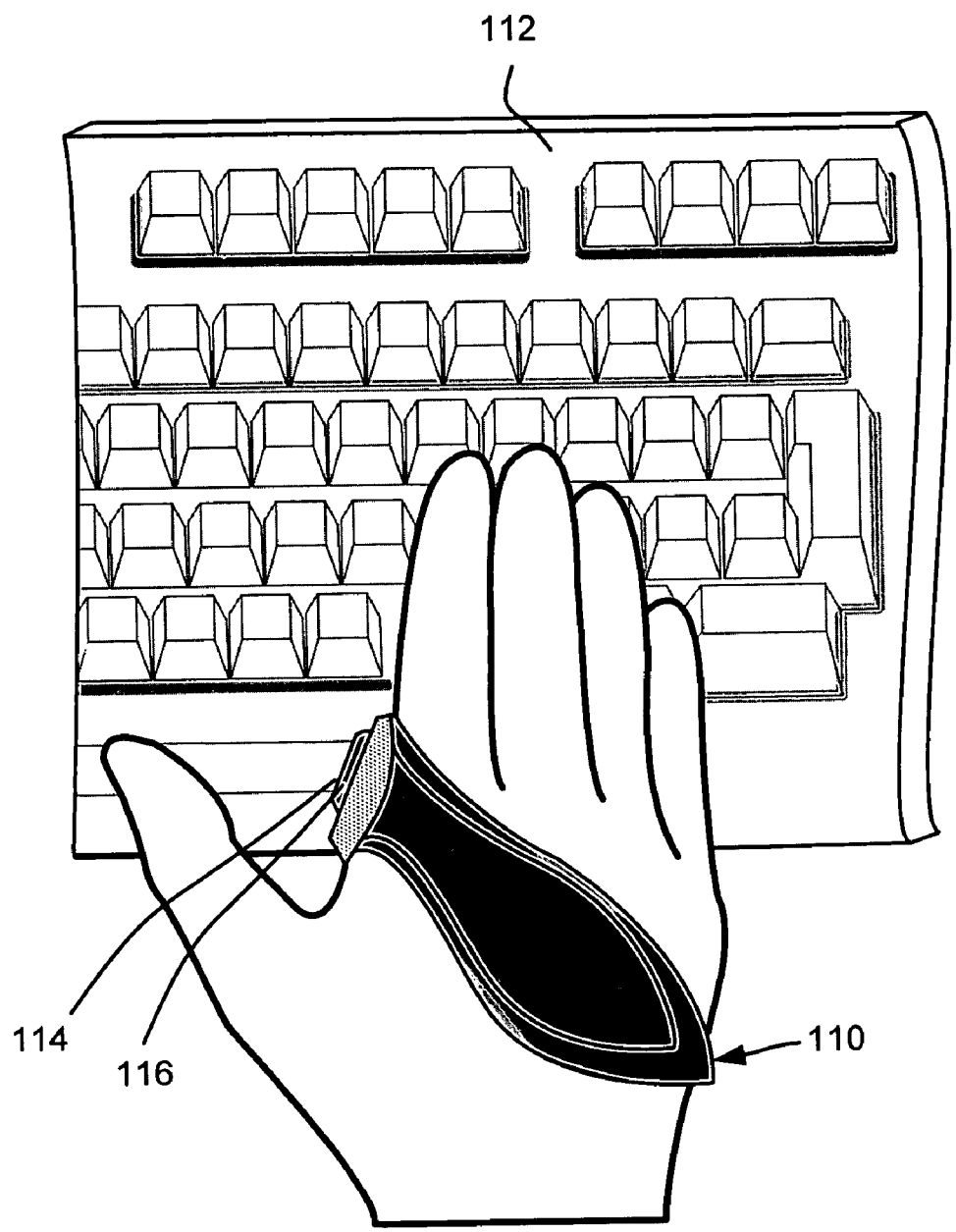
FIG. 1 is a top view representation of an example wearable pointing device that allows a user to type on a conventional keyboard.
Figure 2:
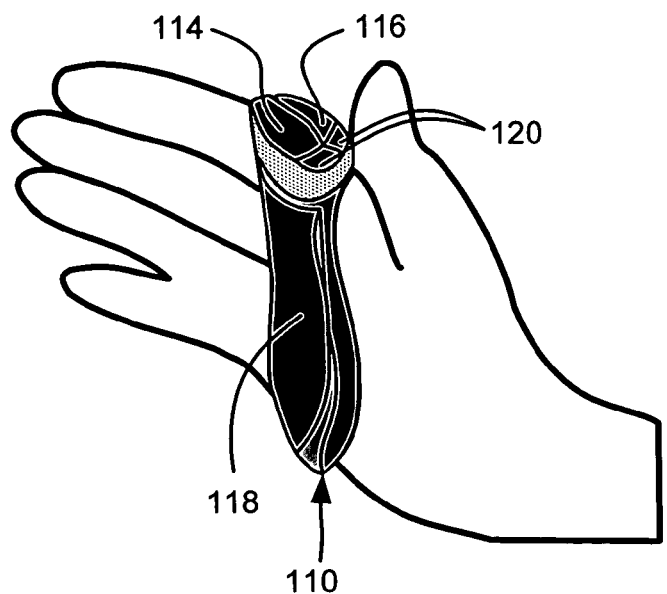
FIG. 2 is a side view representation of an example wearable pointing device in a vertical position.
Figure 3:
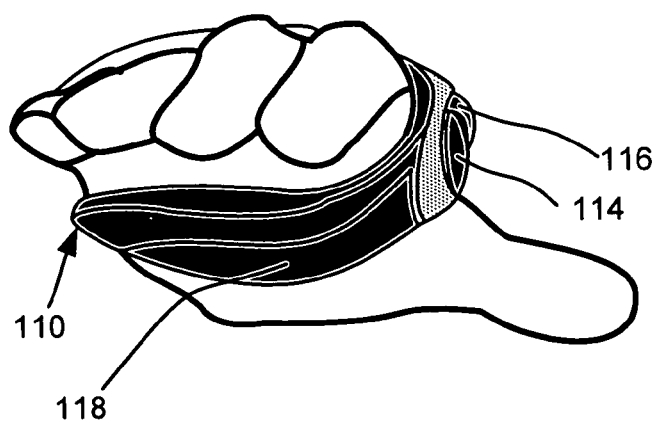
FIG. 3 is a front view representation of an example wearable pointing device in a horizontal position.

FIG. 1 shows a top view of an example wearable pointing device 110. FIGS. 2 and 3 show the example wearable pointing device 110 from other perspectives. One design is styled in the manner of a sports watch, with rubberized overmold, soft rubber buttons, and sleek lines, e.g., with silver and/or color accents. The wearable pointing device 110 may be made of any suitable material, and may be rigid or flexible, or custom fit or adjustable (or accompanied by inserts or the like) to fit different size hands, and so forth. One such model is designed to be sealed and resistant to liquids, skin oils, lotions, dust and other debris.

As is apparent from FIGS. 1-3, the wearer's thumb and fingers remain substantially unimpeded while the device is worn, whereby the wearer maintains the ability to type on a keyboard 112 (FIG. 1 shows part of a conventional keyboard), for example, or otherwise use the hand to grasp objects. Most of the internal mass (e.g., battery and circuit board) are on the part that is outside of the hand, to allow the use of the inside of the hand for gripping objects while worn. The actuation mechanisms are preferably designed so as not to be triggered by objects other that the closed hand; i.e. a mechanical button is preferably recessed, and a capacitive proximity switch sensitive only to highly conductive objects such as fingers.

In the example of FIGS. 1-3, actuation mechanisms such as buttons (e.g., left and right mouse buttons 114, 116 respectively) are shown as being positioned for actuating by the wearer's thumb. Another actuation mechanism, referred to herein as an enable switch 118, is actuated by closing the hand. In one example state, the pointing device 110 is disabled (in a non-operational state, at least with respect to outputting movement signals) when the wearer's hand is open and the enable switch not depressed. The disable signal may locally cause movements to stop being transmitted, or alternatively may be sent to the host device allowing the host software to make the decision about whether to use the movement data or not. In this disabled state, the wearer can move the hand freely, without moving a corresponding cursor on the computing device to which the pointing device is coupled for communication (e.g., a personal computer, a game console, a mobile computing device and so forth), as described below. To move the cursor, the wearer closes the hand and actuates the enable switch 118. Note that other actuation mechanisms such as the left and right mouse buttons 114, 116 may remain operational even when the pointing device 110 is disabled with respect to movement sensing, or alternatively these buttons 114, 116 may also be disabled in the non-operational state. A user preference setting may allow the user to choose the desired mode of operation.

As can be readily appreciated, instead of having a mechanical switch for a button, any of the buttons may be sensors, such as a capacitive proximity sensor. This is particularly useful for buttons that need to be actuated for long periods of time, e.g., the enable switch 118. Instead of depressing a mechanical button, the user can simply close the hand to actuate the capacitive proximity sensor and enable the pointing device 110. Thus, as used herein, the enable "switch" includes any type of actuation mechanism, including a capacitive sensor, mechanical switch, or optical switch and/or sensor. Further note that other types of actuation mechanisms include gestures (described below), and/or actuation patterns of other buttons; for example, a left-right-left mouse button click pattern can be used to hold the device in an enable mode as if an enable switch was held, with a similar or identical pattern used to disable the device with respect to movement signal output.

Thus, as apparent from the examples of FIGS. 1-3, the wearable pointing device 110 allows use of the hands while being worn, including for typing, because it fits behind the knuckles of the hand and does not have to be grasped (e.g., as is required with a legacy remote control device). An object can still be easily held in the hand while wearing the device. In this example, left and right mouse buttons 114, 116 are operated by the thumb, and activating the cursor control mode is accomplished by closing the hand and depressing the large recessed button 118 on the part that is inside of the hand. Note that if the enable switch is a mechanical button, by having the enable switch 118 be somewhat recessed, grasping an object does not activate the device with respect to movement (e.g., cursor control) functionality.

As mentioned above, other configurations and form factors are feasible. For example, an alternative wearable device may have the left and right mouse buttons positioned for actuation by the wearer's forefinger, middle finger, ring finger and/or little finger, with an enable switch actuated by the thumb.

Figure 4:
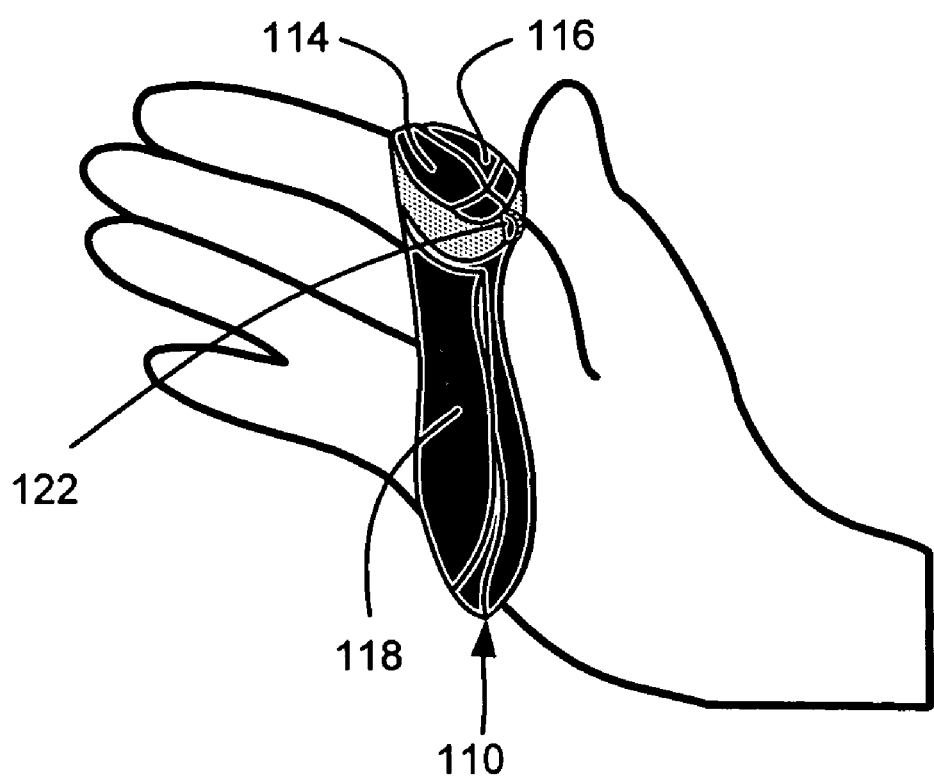
FIG. 4 is a side view representation of an example wearable pointing device, including a scroll wheel, in a horizontal position.

As represented in FIG. 2, other buttons or actuation mechanisms 120 may be present on the wearable pointing device 110. Examples of such actuation mechanisms include (e.g., user-programmable) navigation aids such as "Forward" and "Back" browsing buttons. The host computing device and/or its application may decide a button's meaning. Note that as represented in FIG. 4, a scroll wheel 122 or the like may be positioned essentially anywhere it can be depressed and/or rolled, such as by the wearer's thumb. As can be readily appreciated, additional controls and functions, such as other scroll wheels and/or positions thereof, indicator lights, and remote control functions for devices other than a personal computer may be integrated into the wearable design, with the same or similar benefits.

Turning to an explanation of operation and usage of the pointing device 110, one comfortable operating mode of the device comprises having the user close the wearing hand into a fist to enable it, with the hand in a vertical position with the thumb upward, (as in FIG. 2 but with the hand closed). Up-and-down rotation of the wrist, or pitch, is sensed and is mapped to the y-axis of cursor movement, while a left-and-right rotation of the wrist, (e.g., in a plane parallel to the ground), or yaw, is mapped to the x-axis cursor movement. Other axis mappings may be chosen, e.g., based on the user's preference for how the wrist is held; note however that this may require a third gyroscope to provide three rotation axes instead of two. Note that pitch and yaw may be relative to any starting offset, e.g., a user's hand may start in a somewhat tilted position relative to perfectly upright or perfectly flat.

The cursor motion is relative to whatever position the wrist was in when the tracking button is depressed. In this manner, clutching may be performed by repeatedly opening the hand, repositioning the wrist, and closing the hand again to perform sequential cursor movements.

The above scheme for operation and usage is comfortable and not tiring because such physical actions do not require significant arm movement to produce the yaw and pitch rotations for gyroscopic sensors. Instead, only small movements of the wrist are needed, and moreover, the device 110 can be used in any posture the user prefers to be in, such as lying down, leaning back and so forth. Extended use for browsing is much more comfortable than a remote control form factor, for example, although the device 110 may be used like a remote control device if desired.

Figure 5:
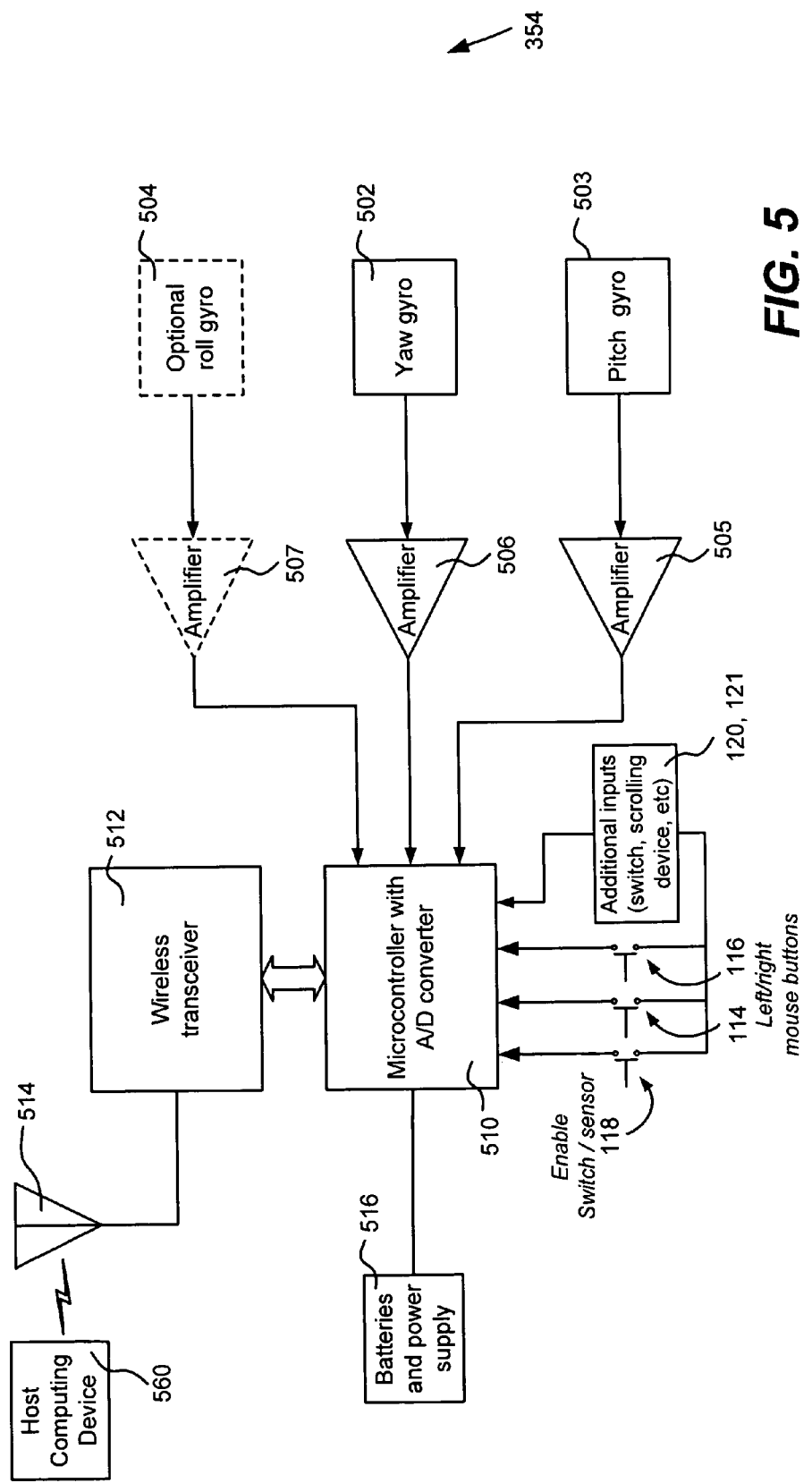
FIG. 5 is a representation of electronic circuitry within a wearable pointing device in one example implementation.

Turning to an explanation of example circuitry, FIG. 5 is a block diagram of one example wearable device circuitry. In FIG. 5, a yaw gyroscope 502 and pitch gyroscope 503 produce analog signals proportional to the rate of rotation around the yaw axis. A roll gyroscope 504 also may provide signals proportional to sensed roll.

One example implementation utilizes a miniaturized version of a gyroscopic sensing platform, comprising ADXRS150 MEMS gyroscopes, commercially available from Analog Devices, Inc. Note that other types of sensors are feasible, e.g., it is mathematically possible to use a three-axis linear accelerometer to sense the direction of the earth's gravity vector and calculate wrist rotation; however, commercial linear accelerometers of currently available technology do not have sufficient resolution for a satisfactory mousing experience, and thus angular rate sensors are used herein. More particularly, the noise and achievable resolution per degree of rotation for present linear accelerometers is considerably inadequate (e.g., an order of magnitude or two away) for use in mousing. For example, a change in position of the earth's gravitational field of one degree results in a change in a 5 volt, 1 g full scale accelerometer output of only $2.5*(1+\cos(1))=380$ microvolts. To output a reasonable number of counts over a wrist rotation of 90 degrees, e.g., 800 counts for an SVGA screen horizontal resolution, requires 9 counts per degree of rotation, meaning a needed resolution of 380/9 or 42 microvolts. This is a relatively very small voltage that is very susceptible to noise and drift effects.

However, the rate gyroscope devices, such as the ADXRS150, have sensitivity to angular rotation of 12.5 mV per degree per second, meaning that a very slow rotation of only one degree per second (⅙ RPM) results in an output of 12.5 mV, about 300 times the signal relative to the linear accelerometer. Further, mouse movements, especially those designed for use within ten feet, tend to be much faster than this slow rotation, giving a proportionally larger signal. With linear accelerometers there is no signal increase with increased angular rotation speed. Note that the angular rate output is integrated over time to give mouse counts, since it is the derivative of angular position. Further, the ADXRS150 devices have a power consumption of about 6 milliamps at 5 volts. It will be appreciated by those skilled in the art that devices of this type will continue to improve in performance and power consumption over time and become lower in cost, making this invention increasingly attractive over time.

The gyroscopes' output signals are amplified by amplifiers 505-507, and sent to an analog-to digital converter section of a microcontroller 510. The signals may be filtered (e.g., digitally) to remove high frequency noise outside the range of possible human movement, and/or low frequency signals corresponding to drift. For example, digital filtering can be performed to further reduce the high frequency noise from the gyroscopes 502-504, as the human range of movement speeds is far less than the frequency response of the gyroscopes 502-504. Signals that indicate a very slow continuous movement correspond to drift, and can likewise be filtered out. Filtering thus eliminates drift and movement of the cursor due to small involuntary movements by the wearer, drift due to temperature or power supply voltages changes, or other sensed vibrations and the like which may come from the environment, for example being in a moving vehicle. Note that filtering at the device saves power, since radio communication is not performed unless actual user-intended movement is occurring.

Note that the analog-to digital converter section shown in FIG. 5 is incorporated into the microcontroller 510. However having one or more separate analog-to digital converters is a feasible alternative. Similarly, instead of or in addition to digital filtering, analog or other filters may be used to remove any undesirable high frequency or low frequency signals.

In one implementation, disabling movement works by having the microcontroller 510 ignore the resultant movement signals unless the microcontroller 510 also detects that the enable switch 118 is actuated. Note that in FIG. 5, the switches/sensors shown are represented as being normally open when not actuated, however it is equivalent to have normally closed switches that open upon actuation.

In the example of FIG. 5, the gyroscopes' rotation rate signals (e.g., filtered) and the actuation mechanisms' status signals (except possibly the enable switch's status) are packetized by the microcontroller 510. The packetized data is sent to a wireless transceiver 512 for transmission via an antenna 514 to the host computing device 560, e.g., via Bluetooth® radio communication. This provides a long wireless range for total coverage, e.g., in a large room, with excellent resistance to interference, and is also supported by many computing devices. Alternative types of wired or wireless communication (e.g., infrared) may be used.

In order to save battery power, a battery-powered power supply 516 may be shut off by the microcontroller 510 after a period of inactivity. The microcontroller 510 may be awakened periodically to check for activity on the gyroscopes 502, 504 or respond to a button press to wake up again.

To summarize, the exemplified microcontroller 510 digitizes the signals from the rate gyroscopes, detects actuation of the buttons, performs the mathematical integration, and formats the data report to be sent to the (e.g., Bluetooth®) radio. One such microcontroller has been implemented in an 8-bit PIC microcontroller, commercially available from Microchip Technology, Inc.

As is understood, in this example a compatible wireless transceiver on the host computing device receives the digital packets from the wearable mouse. A software driver in the host device integrates the x and y rate signals into an absolute cursor position, and handles button presses. The host software driver may provide a user interface that allows response time and sensitivity settings to be set according to preferences. The user interface may also provide a battery status indicator, as well as a representation of any other information provided by the pointing device's circuitry.

Figure 6:
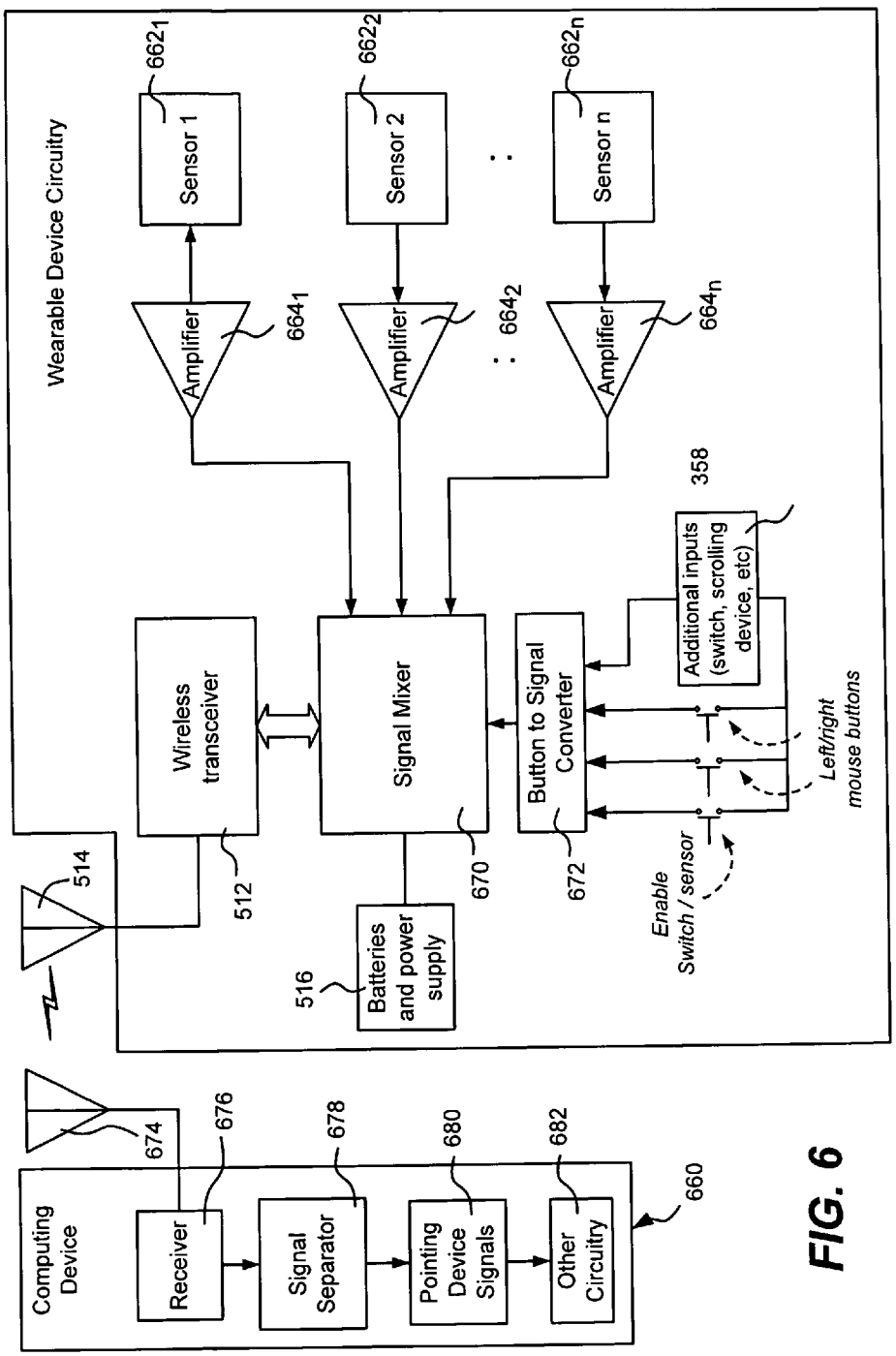
FIG. 6 is a representation of electronic circuitry within a wearable pointing device in another example implementation.

FIG. 6 shows an alternative design in which analog movement signals are sent (e.g., via pulse width frequency modulation) to a host computing device 660. As before, the output signals of the sensors $662_1$-$662_n$ are amplified via amplifiers $664_1$-$664_n$, and filtered as desired. However, rather than digitized and packetized, the analog signals are mixed in a signal mixer 670, (e.g., multiplexed), along with signals representing the buttons, e.g., as converted to analog signals by a converter 672 or the like. An antenna 674 and receiver 676 of the host computing device 660 receive the signals, and a signal separator 678 (e.g., demultiplexer) converts the analog signals to pointing device signals 680 (e.g., mouse events) used by other circuitry 682, e.g., queued for processing by the host device's processor.

Another, optional aspect of the device relates to sensing particular gestures and performing corresponding functions instead of outputting movement signals. Some examples of other functions include actions such as activating scrolling, remotely turning on an electronic appliance, changing the state of a device, entering a mode in a video game, and so forth. More particularly, certain movements of the wearer's hand, which may include when the enable switch 118 is not actuated, may be detected and mapped to specific functions/actions. Certain button actuation patterns may also be detected and mapped to functions/actions.

Figure 7:
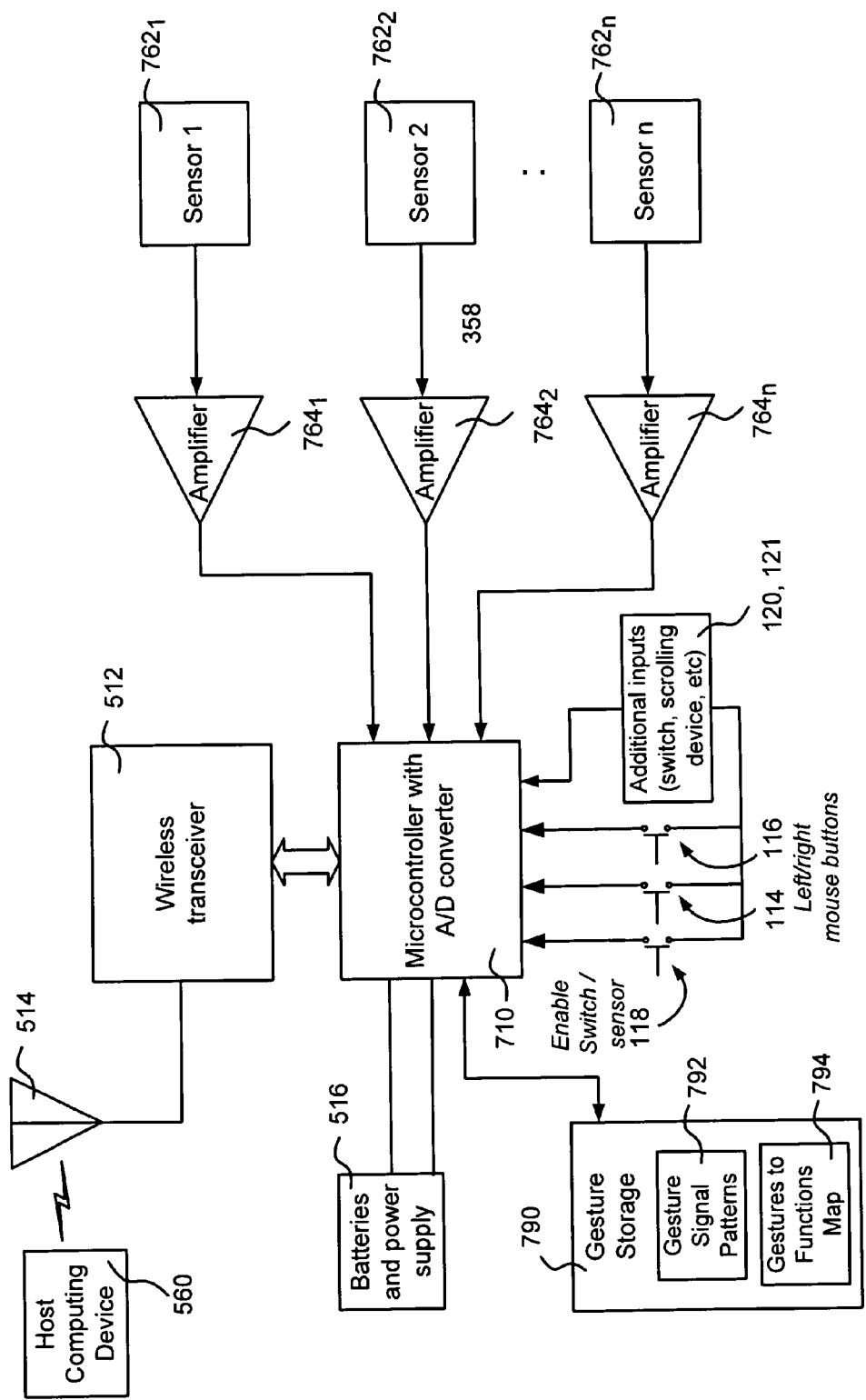
FIG. 7 is a representation of electronic circuitry within a wearable pointing device and coupled to a computing device in another example implementation.

FIG. 7 shows a representation of such circuitry, including most of the circuitry described above with reference to FIG. 5. Note however that the sensors $762_1$-$762_n$ may include other types of sensors, such as one or more accelerometers and/or magnetometers, which may be useful in gesture and position sensing, although gyroscopes for sensing cursor movement sensing are still desirable.

The microcontroller 710 in FIG. 7 may include logic for determining when movement may correspond to a gesture.

Alternatively, gesture evaluation may be performed in the device whenever any signals are being output by the sensors, and/or may be performed by the host computing device. For example, infrared gesture sensing via LEDs and a stereo camera at the host computing device may be employed, as can triangulation using ultrasonic output and a plurality of fixed receivers, such as in a media room.

In general, in the example of FIG. 7, each gesture produces a particular signal pattern that is digitized and stored in gesture storage memory 790, e.g., along with other gesture signal patterns 792. The wearable pointing device 110 may be temporarily put into a gesture recording mode for this purpose, or gesture pattern data may be pre-programmed and/or downloaded to the device.

In normal operation, when the detected movement signals match a gesture pattern to within a preset or user-selected confidence level, a function code or the like is output, e.g., as maintained in a gesture-to-functions mapping table 794 or the like, rather than outputting the movement signals. Note that the wearable pointing device need not know the purpose of the function, which may be decided at the host computing device, e.g., according to user preferences. For example, one gesture may output a code that mutes (and/or restores volume to) speakers controlled by the host computer, while another gesture may output a code that lowers the volume, while another may raise the volume, and so forth. Still another gesture may launch an application program, drop down a menu, simulate a particular button press on a video game controller, and so forth. In this example embodiment no special software is required for gesture interpretation on the host device, as the commands sent to the host in response to gestures simply mimic those of a legacy remote control or other human input device.

Alternatively, the wearable pointing device may know some or all of the functions, and output other data or take another action (instead of outputting movement signals). For example, a certain gesture may put the device into a state in which the enable switch is considered actuated, regardless of its actual state, so that a wearer need not hold his or her hand closed to operate the device. The same or another gesture may exit this state.

Moreover, the same gesture may apply to different devices and/or functions, depending on the wearable device's orientation and/or position. For example, with magnetometer-based sensing, one set of functions (e.g., directed towards controlling a television) may be performed when the gesture is performed with the user facing South, another (e.g., directed towards a personal computer) when the user is facing North, and another (e.g., directed towards room lighting) when the user is facing East. As can be readily appreciated, normal cursor movement signals may also only be transmitted when the user is facing a certain direction.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a system comprising:
a pointing device configured for wearing on a user's hand, the pointing device being generally U-shaped, and having a first part that is configured to fit in a user's palm coupled to a second part that is configured to fit behind a user's knuckles, the pointing device comprising circuitry that senses hand movements, the circuitry including
at least two gyroscopic sensors including a first sensor that senses pitch and a second sensor that senses yaw,
a magnetometer configured to detect a direction that the pointing device is facing,
a gesture detection mechanism configured to cause the circuitry to detect a gesture, output a first data corresponding to performing a first set of functions on a first device corresponding to the gesture when the pointing device is facing a first direction, and output a second data corresponding to performing a second set of functions on a second device corresponding to the gesture when the pointing device is facing a second direction, and
a transmitter that transmits the first data and the second data corresponding to the gesture to a host computing device coupled to the pointing device; and
an enable switch comprising a capacitive proximity sensor that is positioned on the first part of the pointing device that is configured to fit in the user's palm such that the enable switch is actuated while the user's hand is closed and a user's fingers are proximate to the capacitive proximity sensor and such that the enable switch is not actuated when the user's fingers are not proximate to the capacitive proximity sensor,
and wherein the circuitry transmits the first data and the second data corresponding to the sensed hand movements only when the enable switch is actuated.

2. The system of claim 1 wherein the pointing device includes actuation mechanisms corresponding to left and right mouse buttons.

3. The system of claim 2, wherein the actuation mechanisms corresponding to left and right mouse buttons are operational while the enable switch is actuated and when the enable switch is not actuated.

4. The system of claim 1 wherein the circuitry includes a microcontroller that packetizes the first data and the second data into packetized data corresponding to the gesture, and the transmitter transmits the packetized data.

5. The system of claim 1 further comprising a third gyroscopic sensor that senses roll.

6. The system of claim 1 further comprising at least one accelerometer.

7. The system of claim 1 wherein the host computing device comprises a personal computer, a mobile computer, a gaming console, or an electronic appliance.

8. In a computing environment, a system comprising:
a pointing device configured for wearing on a user's hand, the pointing device including a plurality of actuation mechanisms and comprising circuitry that senses hand movements and includes at least two gyroscopic sensors that output analog signals corresponding to movements of the user's hand, including a first sensor that senses pitch and a second sensor that senses yaw,
means for converting the analog signals to digital data,
a magnetometer configured to detect a direction that the pointing device is facing,
a gesture detection mechanism configured to cause the circuitry to
detect a gesture,
output a first data corresponding to performing a first set of functions on a first device corresponding to the gesture when the pointing device is facing a first direction, and output a second data corresponding to performing a second set of functions on a second device corresponding to the gesture when the pointing device is facing a second direction, an enable switch comprising a capacitive proximity sensor that is positioned on the pointing device that is configured to fit in a user's palm such that the enable switch is actuated while the user's hand is closed and the user's fingers are proximate to the capacitive proximity sensor and such that the enable switch is not actuated when the user's fingers are not proximate to the capacitive proximity sensor, and wherein the circuitry transmits the first data and the second data corresponding to the sensed hand movements only when the enable switch is actuated, a microcontroller that detects actuation of each actuation mechanism, and processes the digital data and data corresponding to at least some actuation detection into packetized data for transmission, and a transmitter coupled to the microcontroller to transmit the packetized data to a host computing device.

9. The system of claim 8 wherein the microcontroller performs a mathematical computation on the digital data.

10. The system of claim 8 wherein the microcontroller processes the digital data into packetized data formatted for Bluetooth® radio communication.

11. The system of claim 8 wherein one of the actuation mechanisms comprises an enable mechanism, and wherein the microcontroller or host software ignores the signals corresponding to movements of the user's hand when the enable mechanism is not actuated.

12. The system of claim 8 wherein one of the actuation mechanisms comprises a left mouse button, and another of the actuation mechanisms comprises a right mouse button.

13. The system of claim 8 wherein one of the actuation mechanisms comprises a scrolling device.

14. The system of claim 13 wherein the scrolling device comprises a capacitive scrolling device or a force sensing scrolling device.

15. In a computing environment, a system comprising:

a generally U-shaped pointing device configured for wearing on a user's hand having a first part that fits in the user's palm coupled to a second part that fits behind the user's knuckles, the pointing device comprising circuitry that senses hand movements, the circuitry comprising
an accelerometer,
a magnetometer configured to detect a direction that the pointing device is facing,
a first gyroscopic sensor that senses pitch,
a second gyroscopic sensor that senses yaw,
a third gyroscopic sensor that senses roll, and
a transmitter that transmits data corresponding to the sensed hand movements to a host computing device coupled to the pointing device;

an enable switch positioned on the first part of the generally U-shaped pointed device comprising a capacitive proximity sensor, wherein the enable switch is actuated while the user's hand is closed and the user's fingers are proximate to the capacitive proximity sensor, wherein the enable switch is not actuated when the user's hand is open and the user's fingers are not proximate to the capacitive proximity sensor, and wherein the circuitry transmits the data corresponding to the sensed hand movements only when the enable switch is actuated;

actuation mechanisms corresponding to left and right mouse buttons;

a microcontroller that packetizes data for transmission by the transmitter, the data corresponding to the sensed movement; and a gesture detection mechanism configured to cause the circuitry to
detect a gesture,
output a first data corresponding to performing a first set of functions on a first device corresponding to the gesture when the pointing device is facing a first direction, and
output a second data corresponding to performing a second set of functions on a second device corresponding to the gesture when the pointing device is facing a second direction; and
wherein the transmitter is further configured to transmit the first data and the second data corresponding to the gesture to the host computing device coupled to the pointing device.

* * * * *